United States Patent

[11] 3,626,057

| [72] | Inventor | Malik M. Sarwar<br>Cincinnati, Ohio |
|---|---|---|
| [21] | Appl. No. | 860,815 |
| [22] | Filed | Sept. 24, 1969 |
| [45] | Patented | Dec. 7, 1971 |
| [73] | Assignee | The Immune Milk Company of America, Inc.<br>Cincinnati, Ohio<br>Continuation-in-part of application Ser. No. 747,106, July 24, 1968, now abandoned, Continuation-in-part of application Ser. No. 505,023, Oct. 24, 1965, now abandoned. This application Sept. 24, 1969, Ser. No. 860,815 |

[54] METHOD OF PRODUCING TETANUS ANTITOXIN
4 Claims, No Drawings

| [52] | U.S. Cl. | 424/87 |
|---|---|---|
| [51] | Int. Cl. | A61k 27/00 |
| [50] | Field of Search | 511/747, 106; 424/87; 167/78 MA |

[56] References Cited
UNITED STATES PATENTS

| 3,175,947 | 3/1965 | Goldsmith | 424/87 |
|---|---|---|---|

OTHER REFERENCES

Holm, Abandoned Application Ser. No. 628,987, filed 11/15/45, published in Official Gazette 12/5/50

*Primary Examiner*—Richard L. Huff
*Attorney*—Melville, Strasser, Foster & Hoffman ABSTRACT: A method of producing tetanus antitoxin from the milk system of a cow by hyperimmunization of cows, which are free from Brucellosis and Tuberculosis, with tetanus toxoid and subsequently with toxin, collecting the milk from said hyperimmunized cows, extracting the tetanus antitoxin from said milk by the ammonium sulfate precipitation method and determining the potency of the antitoxin by a toxin-antitoxin neutralization test.

METHOD OF PRODUCING TETANUS ANTITOXIN

CROSS-REFERENCE TO RELATED APPLICATIONS

This application is a continuation in part of a copending application in the name of Mohammad Sarwar, Ser. No. 747,106 filed July 24, 1968, now abandoned, which was a continuation in part of an application copending therewith, Ser. No. 505,023 filed Oct. 24, 1965 and now abandoned.

BACKGROUND OF THE INVENTION

The invention has to do with the field of antitoxins and particularly tetanus antitoxin and more specifically with the production of tetanus antitoxin.

In the past, antitoxins generally, and tetanus antitoxin specifically, have been produced from horse serum. The antitoxin is subcutaneously or intramuscularly injected and is used as a prophylactic and therapeutic agent for the prevention and control of tetanus.

The production of antitoxin from horse serum is an expensive procedure and the volume is relatively small. Probably the greatest drawback to the use of antitoxin derived from horse serum is that many human subjects, when injected with such antitoxin, experience a violent anaphylactic shock. The protein of horse serum is foreign to man and thus there is always a great danger present in the use of a horse serum produced antitoxin because of this violent reaction which may even result in the death of the patient.

SUMMARY OF THE INVENTION

The present invention has to do with the production of tetanus antitoxin from the milk system of cows. The milk and colostrum of any mammal would be expected to be compatible with the system of another mammal, including also a human being. Therefore, it would not be expected that a human being injected with antitoxin produced from milk and specifically from cow's milk, would run the danger of anaphylactic shock.

Furthermore, the milk system of the cow is such that the volume of milk produced and, therefore, the volume of antitoxin which can be derived from the milk is so vastly greater than that which can be derived from horse serum, that the production of the antitoxin becomes very much more economical. It is only possible to get from 1 to 2 pints of blood from a horse as against 100 pounds of milk per day from a cow.

Thus, according to the present invention, the cow is hyperimmunized with a tetanus toxoid and subsequently with tetanus toxin and the injections are made intramuscularly as hereinafter disclosed. The toxoid and toxin may also be injected intravenously, intradermally, intraperitoneally and subcutaneously. They may also be delivered over a sugar cube or dissolved in honey or molasses or in capsules administered orally. The cow may be hyperimmunized at any stage, whether it is pregnant or not or whether it is lactating or not.

The cow is then milked and the milk is collected and the tetanus antitoxin is extracted from the milk by the ammonium sulfate precipitation method. The resulting tetanus antitoxin is tested to determine its potency.

DESCRIPTION OF THE PREFERRED EMBODIMENT

The antigen used for the hyperimmunization was produced as follows:

A medium was prepared comprising 1000 ml. of a veal infusion broth to which 40 grams of ground beef was added and the pH thereof was adjusted to 7.6. Ten percent of paraffin by volume was added to the media and delivered into 2000 ml. bottles and sterilized at 121° C. for 15 minutes using a Standard Automatic Sterilizer. The paraffin floated to the top of the medium and when cooled it solidified to seal the medium against oxygen, thereby creating an anaerobic condition in which the organism can grow and multiply. The upper layer of the solidified paraffin of each bottle was punctured by means of a preheated Cannula. One cc. of a culture of live Clostridium tetani (Strain No. 9441 American Type Culture) was innoculated into the medium through the previously drilled hole by means of a hypodermic syringe having 6 inch Cannula. The innoculated medium bottles were then incubated at 37° C. for 12 days.

Thereafter the medium containing the live growth of Clostridium tetani was removed from the incubator and was filtered through a VIRTIS ULTRABAC filter (The Virtis Company, Inc.) to obtain the purified toxin. The toxin thus attained was tested for sterility to determine whether it was free from any bacterial contamination. The purified toxin thus recovered was then standardized as follows:

MINIMUM LETHAL DOSE

A minimum lethal dose of tetanus toxin was calculated by using serial dilutions of the toxin in normal saline and injecting them subcutaneously in the abdominal region of the guinea pigs. The minimum lethal dose was determined to be 1:200,000/cc.

L+DOSE

The L+ dose of the undiluted toxin was established to be 0.00333 ml. of toxin. (The amount of tetanus toxin diluted 350 times killed the guinea pigs within 4 days in the presence of one-tenth of a unit of a standard antitoxin.)

The cows used for the production of tetanus antitoxin were registered Holstein cows which had been tested for freedom from Brucellosis and Tuberculosis. The selected cows were then bled from the jugular vein and 10 ml. of blood was drawn from the cow. The blood serum was extracted from the blood specimen of each cow and tested for tetanus antitoxin by Precipitation and Ramon tests. Those cows having negative tetanus antitoxin in their blood serum were selected for hyperimmunization with tetanus toxoid and toxin and the hyperimmunization was carried out as follows: Tetanus toxin having 1:200,000 MLD/cc. obtained as described above was heated at 60° C. for 1 hour to inactivate the toxin to render it toxoid. The cows were immunized in two stages. The first stage involved 26 injections of toxoid intramuscularly every fourth day according to the following protocol.

| | |
|---|---|
| Injection No. 1 | 15 cc. |
| Injection No. 2 | 20 cc. |
| Injection No. 3 | 20 cc. |
| Injection No. 4 | 25 cc. |
| Injection No. 5 to 8 | 30 cc. |
| Injection No. 9 | 40 cc. |
| Injection No. 10 | 45 cc. |
| Injection No. 11 to 18 | 50 cc. |
| Injection No. 19 | 60 cc. |
| Injection No. 20 to 21 | 70 cc. |
| Injection No. 22 to 26 | 80 cc. |

It can be seen that the doses were increased gradually from 15 cc. to 80 cc. over a period of 104 days.

The toxin stage involved weekly intramuscular injections of tetanus toxin having 1:200,000 MLD/cc. according to the following schedule:

| | |
|---|---|
| First week | 10 cc. |
| Second week | 20 cc. |
| Third week | 30 cc. |
| Fourth week | 40 cc. |
| Fifth week | 50 cc. |
| Sixth week | 80 cc. |
| Seventh and eighth weeks | 100 cc. |

It will be observed that here again the dose was gradually increased from 10 cc. to 100 cc. over an 8 week period.

The tetanus antitoxin was extracted from the milk by the ammonium sulfate precipitation method. In detail this is carried out as follows: The milk of the hyperimmunized cow (and it should be noted that by the term "milk" it is intended to include the colostrum) is collected and is diluted 1 part of the milk to 3 parts of sterile distilled water. The diluted milk is heated to about 100° F. and concentrated rennet is added in the proportion of about 5 parts of rennet per 100,000 parts of milk. The rennet and milk are thoroughly mixed and the temperature of the milk is reduced to about 80° F. and permitted to rest without agitation for about an hour to permit coagulation. After coagulation has taken place the milk is agitated again to break up the clots, and thereafter the milk serum is collected and casein which has clotted or coagulated is discarded.

The milk serum is then filtered through multiple layers (for example five) of cheesecloth. The pH is then adjusted to 6.8 and ammonium sulfate is added to the milk serum and thoroughly mixed therewith. The ammonium sulfate is added in the proportion of about 1 pound of ammonium sulfate to 1,000 ml. of milk serum. After thorough mixing, the mixture is refrigerated at a temperature of 40° F. for about 12 hours and the clear supernatant liquid is siphoned off and discarded leaving behind the precipitated protein.

This resultant homogeneous solution containing proteins is then centrifuged at 20,000 g. and the clear supernatant solution from the centrifuge tube is discarded and the sediment at the bottom of the tube is recovered in a sterile container. This sediment is then further filtered through a No. 5 (Whatman—W. & R. Balston Ltd. England) filter paper allowing the liquid to filter through the paper and leaving a thick solid on the paper. The filter paper with the thick deposit of protein on it is refrigerated for about 12 hours at a temperature of −20° F. Thereafter the semisolid protein is scraped from the surface of the filter paper with a spatula or the like, and the concentrated protein is emulsified with water in a blender in the proportion of about 5 cc. of water to 10 grams of protein. The resulting emulsion is then dialyzed in the conventional manner against sterile distilled water for 72 hours. The dialysis will remove from the concentrated protein emulsion all traces of ammonium sulfate. When all traces of the salt have disappeared the protein is removed from the dialyzing bag and is freeze dried. This then is the antitoxin.

The resulting tetanus antitoxin produced by the above-described procedure has been tested according to the following protocol. In the first place a determination was made as to what would constitute a minimum lethal dose (MLD) of the toxin for the particular test animals, i.e., guinea pigs and mice. As a first step, serial dilution of the toxin in physiological saline was made to give concentrations of 1:10, 1:100, 1:200, etc. up to 1:10,000.

Variable single doses of the toxin dilution were given to groups of mice and the toxic effect of the toxin in the laboratory animals was observed and the symptoms and time or date of death were recorded.

The toxic effect on mice was well demonstrated as early as 12 hours from the time of inoculation of toxin in the laboratory animals and in many instances a high mortality rate was observed. The most common symptoms were restlessness, overactiveness, frequent urination at the onset of symptoms and dysuria was observed in the late stages. Stiffness of the leg was noticed and was most commonly seen at the point where the toxin was inoculated. Stiffness increased resulting in the dragging of the leg by the test animal, whether it be a mouse or a guinea pig. The most common symptoms in the terminal stages of the disease are the retention of urine and feces and the rejection of food and water. The whole body becomes paralyzed and eventually the animal lies down, turns its head away from the site of the injection with its head bent down toward the ground and experiences difficulty in breathing. The animal dies within a few hours.

The death of the animal inoculated with the toxin proceeded from several hours from the date of inoculation up to several days from inoculation. A small percentage of the animals showed resistance to toxins in low dilution. However, in dilutions beyond 1:2000 the mortality rate progressively decreased, but permanent pathological condition with regard to stiff, nonmobile legs remained as a sequel of the malady.

From the foregoing studies it was determined that tetanus toxin in dilutions of 1:1000 in a dose of 0.2 ml. per mouse is lethal. This minimum lethal dose then was utilized in testing the tetanus antitoxin produced according to the present invention as shown in the following experiments.

In the first experiment the neutralization of tetanus toxin by the tetanus antitoxin produced as above described was demonstrated by the Ramon Test, by mixing the tetanus toxin with variable amounts of the tetanus antitoxin. The tetanus toxin and antitoxin were mixed and incubated at room temperature for a period of 1 hour and then a dose of 0.2 ml. per guinea pig was injected intramuscularly into each animal. The control group was given an injection of the toxin alone, with which no antitoxin had been mixed. On the other animals 0.2 ml. toxin was mixed respectively with 0.2 ml., 0.4 ml., 0.6 ml., and 0.8 ml. of the tetanus antitoxin, and a dose of 0.2 ml. of the mixture was inoculated into each animal of the experimental group.

The results show that all the experimental guinea pigs survived, indicating that the effectiveness of the antitoxin was 100 percent. All of the control animals died, showing that the mortality in the controls was also 100 percent.

In a second experiment, an Animal Protection Test, the tetanus toxin was serially diluted in proportions of 1:10, 1:100, 1:500, and 1:1000 and 0.2 ml. of each of the foregoing dilutions were mixed with 0.2 ml. of the antitoxin produced by the present invention. Again the mixture was incubated for 1 hour and 0.2 ml. of the mixture was injected intramuscularly into each animal. The results showed that where the toxin was more concentrated the protection was comparatively less. Because of the conflicting results which were obtained from the above experiment and which may be attributed partly to the cannibalistic habit of male mice killing each other, the experiment was repeated with dilutions of the toxin in proportions of 1:10, 1:100, and 1:500. The results of this repeat test showed that all the experimental mice acquired immunity and all the control mice died. It is apparent therefore that when 0.2 ml. of the toxin in a dilution as low as 1:10 is mixed with 0.2 ml. of the tetanus antitoxin produced from milk as above described, complete neutralization of the toxin results. Thus, when the animals were injected with such a mixture they acquired complete protection.

A third experiment, also an Animal Protection Test, was carried on to verify the results of the two experiments above described. In this experiment the tetanus antitoxin produced by the present invention was mixed in equal proportions with tetanus toxin and was incubated for 15 minutes at room temperature. Of this mixture, 0.2 ml. was injected into the right foot pad of a group of guinea pigs. The control group was injected with 0.2 ml. per guinea pig of tetanus toxin diluted 1 to 100 but not mixed with the antitoxin. All of the experimental guinea pigs survived and all of the control group died. This third experiment then clearly shows that when 0.2 ml. of tetanus antitoxin according to the present invention is mixed with undiluted potent tetanus toxin in the amount of 0.2 ml., it is capable of neutralizing the toxic effect of the toxin. The potency of the toxicity of the toxin was well demonstrated by the fact that it caused death to the control animals in 24 hours when diluted 1:100.

In a fourth experiment, the antitoxin from milk was serially diluted 1:10, 1:20, 1:30, 1:40, 1:50, 1:60, 1:70, 1:80, 1:90, 1:100 and then was mixed with 1 L+ (L plus) dose and saline, and was injected subcutaneously on the abdomen of guinea pigs weighing 370–380 grams. The guinea pigs were kept under observation for 96 hours. The following results were obtained.

| Milk T.A.T., diluted 1:10 etc. (to 1:100). | Cc. |
|---|---|
| Volume | 1.0 |
| Tetanus toxin, 1 L+ dose | 1.0 |
| Normal saline | 1.0 |
| Dose/G.H | 3.0 |

The results of the experimental studies indicated that a minimum of 100 international units antitetanus toxin are present per cubic centimeter of milk.

From the foregoing description, it will be understood that antitoxins against various toxins may be produced by the method herein described and that the resulting antitoxin will be produced much less expensively and in much greater volume than has heretofore been considered possible using horse serum.

It will be understood that minor modifications of the procedures may be made without departing from the spirit of the invention and no limitation is intended which is not specifically set forth in the claims which follow.

We claim:

1. The method of producing a tetanus antitoxin through the milk system of a cow by hyperimmunization with tetanus toxoid and toxin comprising:
  a. hyperimmunizing Brucellosis- and Tuberculosis-free cows with a toxoid and a toxin having respectively a potency such as is achieved by
    1. preparing a medium comprising 1000 ml. of veal infusion broth and 40 grams of ground beef;
    2. adjusting the pH of the medium to 7.6;
    3. placing said medium with 10 percent paraffin by volume into previously sterilized bottles to provide anaerobic conditions;
    4. injecting into said sterile, sealed medium 1cc. of a live culture of Clostridium tetani (strain No. 9441, American Type Culture);
    5. incubating said culture at 37° C. for 12 days;
    6. filtering the medium through VIRTIS ULTRABAC filter;
    7. subjecting said purified toxin to a sterility test to determine absence of bacterial contamination;
    8. standardizing the purified toxin as to MLD and L+ dose;
    9. converting a portion of purified toxin into toxoid by heating at 60° C. for 1 hour.
  b. the toxoid being injected at 4 day intervals with doses increasing gradually from 15 cc. to 80 cc. over a period of 104 days;
  c. the toxin, having 1:200,000 MLD/cc. being injected thereafter at 1 week intervals with doses increasing gradually from 10 cc. to 100 cc. over a period of 8 weeks;
  d. collecting the milk of said hyperimmunized cows, and
  e. extracting the antitoxin from said milk by ammonium sulfate fractionation.

2. The method of claim 1, wherein each cubic centimeter of the antitoxin contains a minimum of 100 international units of tetanus antitoxin.

3. The method of claim 1, wherein said antitoxin is subjected to a toxin-antitoxin neutralization test, and wherein complete neutralization of the toxin is achieved when 0.2 ml. of the antitoxin, at a dilution of 1:1000, is mixed with 0.2 ml. of the toxin.

4. The method of claim 3, wherein said antitoxin is subjected to a toxin-antitoxin neutralization test, and wherein complete neutralization of the toxin is achieved when the toxin, diluted as low as 1:10, is mixed with an equal amount of the antitoxin, such that test animals injected with said mixture acquire complete protection.

* * * * *